Sept. 13, 1960     F. F. PFAFF     2,952,490
AUTOMOBILE FRONT SEAT BACK LOCK
Filed May 20, 1957
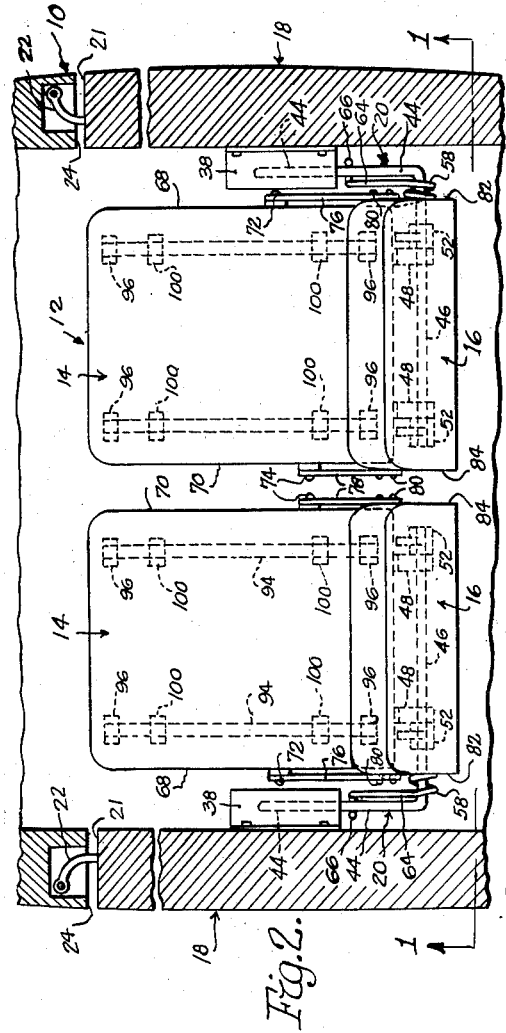
INVENTOR.
Frank F. Pfaff
BY Barthel + Bugbee
Attys

United States Patent Office 2,952,490
Patented Sept. 13, 1960

2,952,490

AUTOMOBILE FRONT SEAT BACK LOCK

Frank Farrand Pfaff, Comins, Mich.

Filed May 20, 1957, Ser. No. 660,415

2 Claims. (Cl. 296—65)

This invention relates to automobiles and, in particular, to safety devices for automobiles.

One object of this invention is to provide an automobile front seat back lock which automatically locks the swinging backs of the front seats of two-door automobile bodies against swinging forward when the automobile front doors are closed, so as to prevent the forward swinging of the seat backs by momentum in the event of a sudden stop or collision.

Another object is to provide an automobile front seat back lock of the foregoing character wherein means is provided for automatically locking the front seat backs of longitudinally-adjustable front seats regardless of the position of the front seat assembly as a whole.

Another object is to provide an automobile front seat back lock of the foregoing character wherein the swinging front seat backs are locked by locking levers which in turn are actuated by cam elements carried by the front doors, through intermediate mechanism actuated by the engagement of the cams therewith upon closing the doors.

Other objects and advantages of the invention will become apparent during the course of the following description of the accompanying drawing, wherein:

Figure 1 is a vertical cross-section through a passenger automobile body in a plane immediately behind the front seats, taken along the line 1—1 in Figure 2, the automobile doors being shown diagrammatically;

Figure 2 is a horizontal section, generally in top plan view, taken along the line 2—2 in Figure 1; and Figure 3 is a right-hand side elevation of the right-hand front seat shown in Figures 1 and 2, in its locked position but with the door and door cam omitted to avoid concealing other parts.

Referring to the drawing in detail, Figures 1 to 3 inclusive show diagrammatically the forward portion of an automobile body, generally designated 10, occupied by the front seat assemblies 12. The front seat assemblies 12 are of a conventional type having lower seat cushion structures 14 to which seat back structures 16 are pivotally connected for forward or rearward swinging in order to enable passengers in the rear seat (not shown) to enter and leave the vehicle through either of the front doors 18 of the automobile body 10. The present invention provides front seat back locking devices, generally designated 20, for preventing such swinging during travel. The front doors 18 are also conventional and are hinged to the body 10 at their forward edges 21 by conventional concealed hinges 22, so as to swing into and out of the door opening 24. The details of the doors 18 are omitted in order to avoid complicating the disclosure, but it will be understood that they are provided with the usual roll-up windows 26 at their window sills 28 and have their lower edges 30 closely adjoining the door sills 32 adjacent the floor 34 of the body 10. Bolted or otherwise secured to each front door 18 on the inner wall 36 thereof spaced a short distance above the lower edge 30 is a seat-lock-operating deflector or cam 38 having an inclined cam portion 40 (Figure 1) positioned immediately opposite the lower front seat cushion assembly 14.

Engageable with the inclined cam portion 40 of the cam 38 in the closed position of each front door 18 is the upwardly-curved contact portion 42 of a lock operating arm 44 (Figure 3). The arm 44 projects forwardly from a cross shaft 46 which is journaled in laterally-spaced bearing brackets 48 (Figure 1) bolted or otherwise secured to the rearward end 50 of each seat cushion structure 14. Pinned or otherwise operatively connected to each cross shaft 46 are the laterally-spaced hubs 52 of upstanding seat-back-locking arms 54 having hooked upper ends 56. A coiled torsion spring 58 with the end of one arm 60 bolted or otherwise secured at 62 to the lower seat cushion structure 14 encircles each cross shaft 46 at its outer end and has an upper arm 64 with a U-shaped forward end 66 hooked under the operating arm 44 in such a manner as to constantly urge each arm 44 upwardly toward its respective cam 38.

Each lower seat-cushion structure 14 on its outer and inner sides 68 and 70 respectively is provided with longitudinally-offset pivots 72 and 74 respectively on which the forward ends of bent seat-back-supporting arms 76 and 78 of different lengths are pivotally mounted, the upper ends of these arms being bolted or otherwise secured as at 80 to the opposite sides 82 and 84 of the seat back structures 16. These unequal length arms 76 and 78 are provided for the purpose of swinging the seat back structures 16 forward and inward to provide a wider passageway to the door openings 24 for passengers entering or leaving the vehicle. The rear panels 86 of the seat back structures 16 are provided with laterally-spaced holes 88 aligned with the hooked ends 56 of the upstanding locking levers 54 so as to engage the hook portions 56 with the lower edges 90 of the holes 88 as keepers in the locked positions of the seat back structures 16 (Figures 1 and 3).

In modern automobile bodies, the front seat assemblies 12 are usually adjustable longitudinally along the body floor 34 in order to adapt them to both tall and short people. Such seat adjustment mechanisms and their construction are conventional and beyond the scope of the present invention. They affect the present invention only to the extent that the present invention provides for actuation of the seat locking devices 20, regardless of the forward or rearward position of adjustment of each seat. For this purpose, the seat adjustment mechanism, generally designated 92, has been shown in purely diagrammatic and simplified form as consisting of a pair of laterally-spaced rods 94 mounted in longitudinally-spaced brackets 96 (Figure 3) bolted or otherwise secured to the under side 98 of each lower seat cushion structure 14. The rods 94 pass through and slidably and reciprocably engage longitudinally-spaced upstanding brackets 100 which are bolted or otherwise suitably secured to the floor 34. A latching device (not shown) is conventionally installed adjacent the rods 94 to releasably latch them in their adjusted positions after the lower seat cushion structure 14 has been slid forward or backward in its brackets 100 to the desired position most comfortable for the particular driver or passenger, as the case may be.

In the operation of the invention, let it be assumed that the vehicle has been travelling and that it is coming to a halt so as to permit passengers to leave the rear seats of the vehicle (not shown) and pass outward through the passageway between the front seat backs 16 and the door openings 24. From the drawings, particularly Figures 1 and 3, it will be seen that during travel, the front seat back structures 16 cannot be swung forwardly on their supporting arms 76 until the locking devices 20 have been unlocked, specifically by withdrawing the hook portions 56 of the seat-back-locking arms 54 from the keeper edges 90 of the holes 88 in the front seat back panels 86. Such unlocking motion is, however, prevented for the time being by the engagement of the inclined portion 40 of the cam 38 with the contact portion 42 of the operating arm 44 (Figures 1 and 3), forcing the arm 44 downward against the opposing upward pull of the torsion spring 58.

When, however, someone unlatches either of the front doors 18 and swings the door outward from its closed position shown in Figures 1 and 2, the outward swinging of the door 18 upon its hinges 22 also swings the cam 38 outward out of engagement with the arcuately-curved contact portion 42 of the operating arm 44 of the locking device 20. When thus released from the hold-down action of the cam 38, the operating arm 44 swings upward in response to the upward pull upon it by the end 56 of the arm 64 of the torsion spring 58, rotating the cross shaft 46 a partial revolution in a counterclockwise direction (Figure 3). The counterclockwise rotation of the cross shaft 46 in its bearing brackets 48 swings the upstanding locking arms 54 rearwardly so as to withdraw their hooked ends 56 from the holes 88 in the front seat back panels 86 and consequently out of engagement with the keeper portion edges 90 thereof, as shown by the dotted line position of the visible locking arm 54 in Figure 3. The passenger now wishing to leave the automobile is enabled to push either of the front seat back structures 16 forwardly so as to provide the necessary passageway room for leaving the vehicle through the door opening 24.

When the rear seat passengers have departed in this manner, and the vehicle resumes its travel or the front doors 18 are closed for other reasons, such as parking, the inward swinging of each door 18 and its respective cam 38 engages the inclined portion 40 thereof with its particular contact end 42 of the adjacent operating arm 44, swinging the latter downward and rotating the cross shaft 46 in a clockwise direction. This action swings the upstanding locking arms 54 forwardly in a clockwise direction from the dotted line position of Figure 3 to the solid line position thereof. When this occurs, the hook portion 56 at the upper end of each arm 54 swings through its respective hole 88 in the back panel 86, into locking engagement with the keeper portion 90 at the lower edge of each hole 88. Under these conditions, the sudden halting of the vehicle either by intention or by accident cannot result in either of the front seat back structures 16 swinging forward by its momentum around the pivots 72 and 74 of the supporting arms 76 and 78 because the consequent upward and forward swinging of the seat backs 16 and panels 86 brings their keeper portions 90 immediately into locking engagement with the hook portions 56 on the upper ends of the locking arms 54. Serious accidents to the front seat passengers may thereby be prevented, especially if seat belts have also been installed.

What I claim is:

1. An automobile front seat back lock comprising a lock keeper in the swinging seat back of an automobile front seat unit having a lower cushion structure supported upon an automobile body floor structure adjacent a door thereof movable between open and closed positions, a shaft bearing assembly adapted to be mounted upon said lower cushion structure with the bearing axis thereof disposed transversely to said lower cushion structure, a rotary shaft rockably mounted in said assembly, an operating arm operatively secured to said shaft substantially perpendicularly thereto and extending forwardly therefrom in an approximately horizontal position, said operating arm having a forward end portion adapted to project into close proximity to the door in the closed position of the door, a locking arm member secured to said shaft and extending upwardly from said shaft approximately perpendicularly to said operating arm, said locking arm having a hooked upper end movable in response to the rocking of said shaft into and out of locking engagement with said keeper, and an operating arm deflector adapted to be mounted on the door in the path of said forward end portion of said operating arm and responsive to the closing swing of the door to shift said operating arm and consequently move said locking arm in a locking direction engaging said upper end of said locking arm with said keeper in locking relationship therewith.

2. An automobile front seat back lock, according to claim 1, wherein the deflector has an oblique portion engageable with the forward end of said operating arm in downward swinging engagement therewith during the closing motion of the door.

References Cited in the file of this patent

UNITED STATES PATENTS

| | | |
|---|---|---|
| 644,054 | Brown | Feb. 27, 1900 |
| 2,559,548 | Seigneur | July 3, 1951 |
| 2,624,613 | Parmely | Jan. 6, 1953 |